EXAMINER'S ROOM
W. Hinds,
Saw-Set,
7,708 × Patented Aug. 12, 1833.
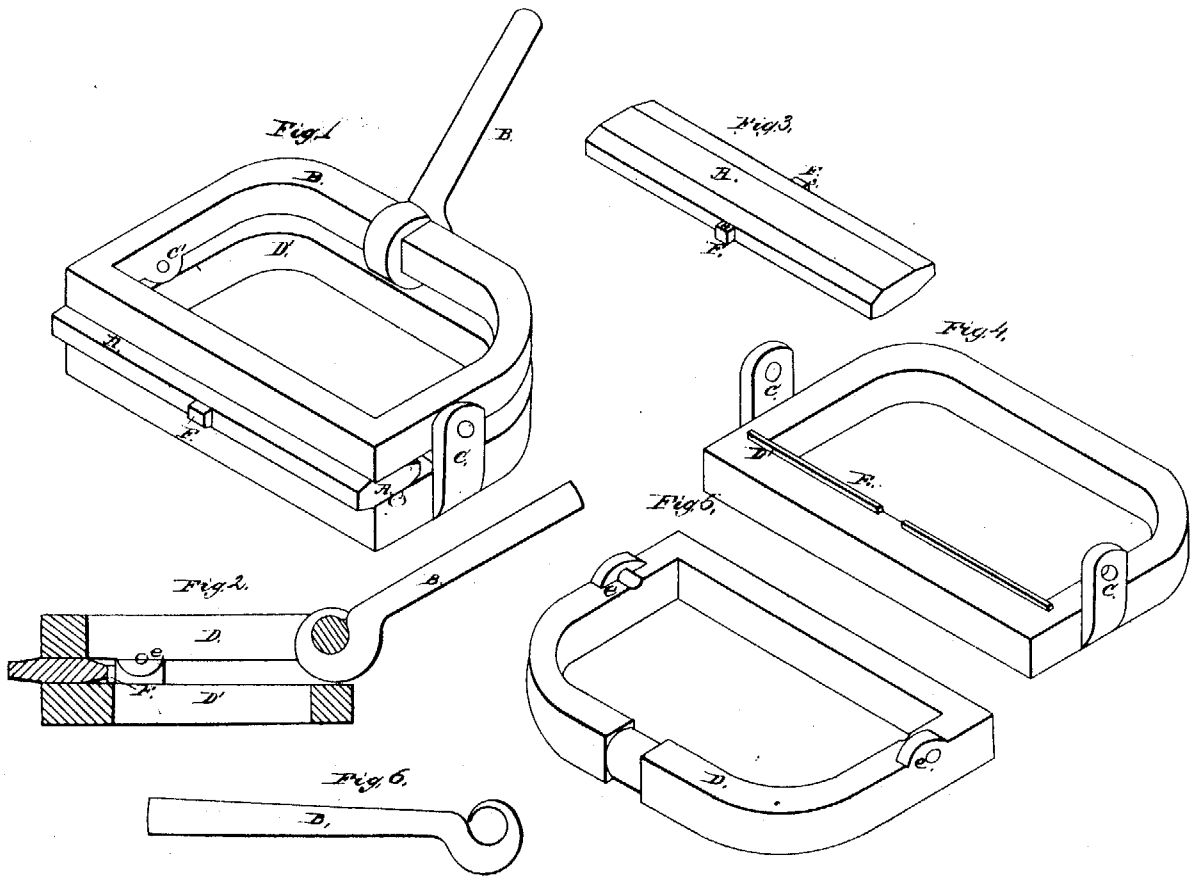
N. PETERS, PHOTO-LITHOGRAPHER, WASHINGTON, D. C.

Aug 12, 1833

7708x William Hinds Otsego N. Y.

Letters Patent

The schedule referred to in these Letters Patent and making part of the same containing a description in the words of the said William Hinds himself of his improvement in the saw set -

To all to whom these presents shall come Be it known that I William Hinds of Otsego in the County of Otsego and State of New York have invented a new and useful improvement in a machine for setting saws and that the following is a full and exact description of the construction and operation of said machine as invented or improved by me. The principle character or part of this machine is made of cast iron 5 inches long 1 inch wide and ¾ ths of an inch thick and is called the formula for sake of distinction. The 4 edges or side corners of the formula 1/16 th of an inch in width from the corners back towards the centre are bevilled or taken off to make room for the bend or set of the saw teeth, on one edge or side of the formula the quantity bevilled or taken off is just sufficient to set saws in the narrowest width or space ne-cessary. On the opposite or second edge or side the quantity bevilled or taken off is little more than on the first edge or side and on the third edge or side the quantity bevilled or taken off is still more than it is on the second edge or side and so on making four gradually different inclinations or inclined planes on the edge or side corners of the formula. On each of the two opposite edges of the formula midway from the ends is a knob or stem projecting out 1/16 th of an inch on which are numbers that represent the different inclinations on the edge or side corners. These knobs or stems serve also to keep the formula in its place in a kind of vice into which it is put. The vice above alluded to is formed of two parts or pieces of cast iron each part or piece is in shape of the Capital letter D and are each 5 inches long in the straight part and about 4 inches in diameter transversely. In the description of the vice the two parts in shape of the letter D above mentioned will be called the upper and the under D. The vice and formula may also be made of wrought iron

77087.

or other metal but if made of cast iron will be equally as good and much
cheaper. The formule should be cast of hard iron or be made of steel and
hardened. The bar of iron or other metal that forms the Ds should be about
1/2 inch wide by 3/4ths of an inch deep, except the straight part of the under D)
which should be but half an inch deep with a [illegible] top for the reception
of the formule which is held in its place by a [illegible] or projection [illegible] 1/8
[illegible] an inch high on the back or outside of the straight part of the under D
The straight part of the upper D is half an inch square and may be called
the guide as the inner edge stands exactly over the line on the formule
from which the inclinations are made. Around the middle of the circular part
of the upper D is a kind of lever about 4 inches long made of a rod of iron
3/8 of an inch square by thinning or tapering [illegible] the end to the thickness of
1/8 of an inch at the end with a true taper and long enough to encompass
the D which is made round for that purpose. It is then bent round the
D. The two parts or Ds are connected together about one inch from the inner
edge of the formule on the circular part by a hinge at each end [illegible]
[illegible] the hinge in a Blacksmiths vice. This machine will set most all
kinds of straight saws in 4 different scales or widths by shifting the for-
-mule in the vice so that saws may be set on either edge or side thereof.
The method of setting is to place the saw in the machine with the back
outward observing to let no more than the length of the teeth extend
inside of the inner edge of the guide. Then fasten the saw by turning
the lever by which a thicker part of the lever or loop to the lever is
carried in between the parts of the vice thereby straining the vice apart
at the lever and compressing it at the straight part. The saw is set by
placing a punch [illegible] on the teeth and striking it sufficiently with
a hammer. This operation sets four inches in length on the saw when it
has to be removed so much in the vice, and set as before and so on. For
setting circular saws such as mill - cross cut - [illegible] - whip & circle saws &c.
a machine is made of cast iron, steel or wrought iron about 6 inches
long and from 3/4 of an inch to 1/2 inch square with the inclinations at
the ends. Two inclinations at each end on opposite sides of said iron
or steel are made from 1/4 to 1/2 an inch in length. These four inclinations are made with gradual difference to set saws of four different scales or [illegible]
from the narrowest to the widest width necessary. The process of using the
last described machine is to place it on a bench and place the saw-teeth
severally on the inclined [illegible] and strike them with a hammer. Or if the
saw is fast in any machine or mill the machine for setting can be
held firmly against the saw-teeth and set as before &c. The invention or
discovery of every part of the machine above specified and described (except
the punch to be used in the same) has been made by me the said William
Hinds without the knowledge of any machine being in use or patented
having any similarity to it but from information since received it ap-
-pears probable that a machine similar to this in some parts especially the
part called the formula was patented to John Simmons of Pennsylvania
in 18[illegible] in case of which the invention of the said machine as above spe-
-cified and described is claimed as an improvement. The invention
or discovery of the improvement in the different forms or constructions
hereinafter described in which said machine may be made is also
claimed. First a different lever may be made to throw one part or
one part of the vice that by turning will wedge in between the parts of
the vice and strain them apart the same as the other lever or the parts
of the vice and strain them apart the same as the other lever or the
parts of the vice may be strained apart by a screw that will screw through
one part of the vice and against the other part Second the vice may be made in
a different form without hinges of cast or wrought iron and fastened
or drawn together by a screw or lever in the centre near the formula Witnesses William Hinds

[illegible]

George Delong (M.8 [illegible]) (Patented August 12, 1833)